(12) United States Patent
Kominar

(10) Patent No.: US 9,954,803 B1
(45) Date of Patent: Apr. 24, 2018

(54) METHOD OF AUGMENTING A VOICE CALL WITH SUPPLEMENTAL AUDIO

(71) Applicant: BlackBerry Limited, Waterloo (CA)

(72) Inventor: Jeremy Lawson Kominar, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 15/419,515

(22) Filed: Jan. 30, 2017

(51) Int. Cl.
  H04L 12/58 (2006.01)
  G10L 13/08 (2013.01)
  H04M 3/42 (2006.01)
  H04M 3/493 (2006.01)

(52) U.S. Cl.
  CPC ............. H04L 51/10 (2013.01); G10L 13/08 (2013.01); H04M 3/42221 (2013.01); H04M 3/4936 (2013.01)

(58) Field of Classification Search
  CPC .... H04L 51/10; G10L 13/08; H04M 3/42221; H04M 3/4936
  USPC ...................................................... 455/414.1
  See application file for complete search history.

(56) References Cited

U.S. PATENT DOCUMENTS

| | | | | |
|---|---|---|---|---|
| 2002/0045439 A1* | 4/2002 | Kushita | ............. | H04M 1/72547 455/412.1 |
| 2004/0192355 A1* | 9/2004 | Nowlan | .................. | H04W 4/12 455/466 |
| 2006/0211455 A1* | 9/2006 | Choi | .................. | H04L 12/5895 455/567 |
| 2007/0192105 A1* | 8/2007 | Neeracher | ............... | G10L 13/08 704/258 |
| 2008/0261564 A1* | 10/2008 | Logan | ................. | G08B 13/1427 455/413 |
| 2009/0143007 A1* | 6/2009 | Terlizzi | ............. | H04M 1/72522 455/3.06 |
| 2009/0225970 A1* | 9/2009 | Grigsby | ................. | H04R 27/00 379/202.01 |
| 2012/0180134 A1* | 7/2012 | Coughtrey | ............ | G06F 21/606 726/26 |
| 2013/0040600 A1* | 2/2013 | Reitnour | ................. | G01S 19/17 455/404.2 |
| 2014/0095170 A1* | 4/2014 | Roper | ...................... | G08B 3/00 704/274 |
| 2014/0108568 A1* | 4/2014 | Lee | ..................... | H04L 12/1818 709/206 |
| 2015/0215249 A1* | 7/2015 | Bruns-Bielkowicz | .. | H04L 51/10 709/206 |

OTHER PUBLICATIONS

Various authors, How to play an audio file on a voice call in android, Stack Overflow, http://stackoverflow.com/questions/8784221/how-to-play-an-audio-file-on-a-voice-call-in-android, at least as early as Sep. 30, 2016.

(Continued)

Primary Examiner — Michael Mapa
(74) Attorney, Agent, or Firm — Ridout and Maybee LLP

(57) ABSTRACT

The present disclosure relates to a method of augmenting a voice call with supplemental audio. In one example, the method comprises: receiving predetermined input on a first mobile device during a voice call established between the first mobile device and a second mobile device; determining an audio segment corresponding to the predetermined input; and sending the audio segment from the first mobile device to the second mobile device over a communications network during the voice call.

22 Claims, 7 Drawing Sheets

(56) References Cited

OTHER PUBLICATIONS

Various authors, Iphone Playing sound over a phone call, http://stackoverflow.com/questions/2137068/iphone-playing-sound-over-a-phone-call, Stack Overflow, at least as early as Sep. 30, 2016.
Unknown author, Switch Audio Modes in Session, https://support.citrixonline.com/en_US/Meeting/all_files/G2M040004, Citrix, at least as early as Sep. 30, 2016.
Hawon Nguygen, How to Transmit Music/Sound Effects Over a Phone Call on iPhone, http://wceftech.com/transmit-music-sound-effect-over-phone-call-on-iphone/, WCCF PTE LTD., at least as early as Sep. 30, 2016.
Unknown author, Soundboard Apps for Podcasters and DJs, http://appadvice.com/appguides/show/soundboard-apps-for-podcasters-and-djs, AppAdvice LLC, at least as early as Sep. 30, 2016.

* cited by examiner

METHOD OF AUGMENTING A VOICE CALL WITH SUPPLEMENTAL AUDIO

TECHNICAL FIELD

The present disclosure relates generally to the field of communications, and more particularly to a method of augmenting a voice call with supplemental audio.

BACKGROUND

Mobile wireless communications devices ("mobile devices") such as smartphones and tablets are increasingly being used to performing a variety of activities during a voice call. For example, it is not uncommon for users to interact with an application during a voice call. There is remains a need for mobile devices that facilitate supplemental forms of communication during a voice call.

DETAILED DESCRIPTION OF EXAMPLE EMBODIMENTS

Figure 1:
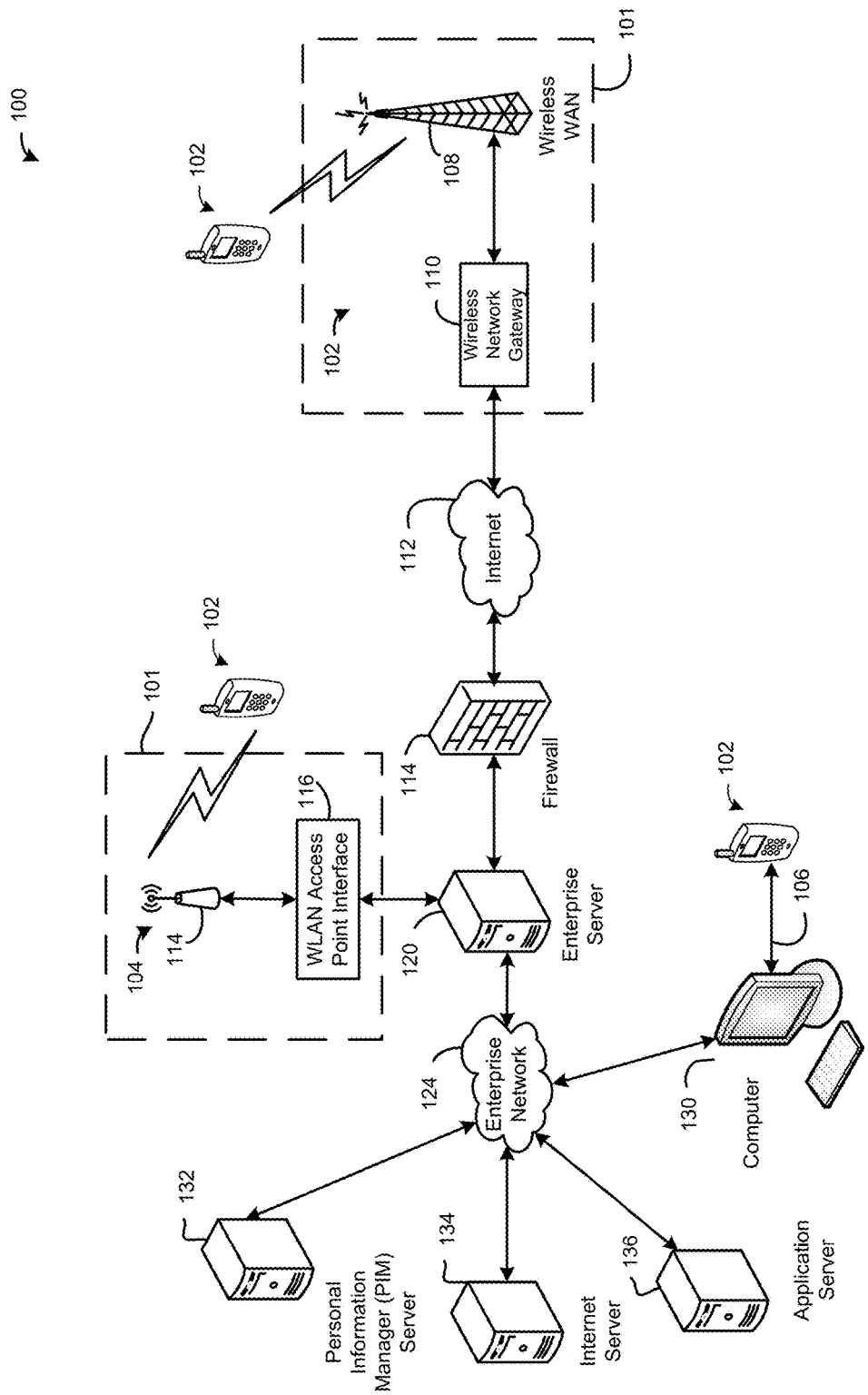
FIG. 1 is a schematic block diagram illustrating a communication system including a mobile wireless communication device to which example embodiments of the present disclosure can be applied.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

The present disclosure provides a method of augmenting a voice call with supplemental audio. In one aspect, the present invention combines or interweaves audio into a voice call. The audio may be pre-recorded words, phrases, numbers, number strings or synthesized audio generated using text-to-speech synthesis, possibly in a user's own voice based on pre-recorded voice samples. The audio that is combined or interweaved into the voice call is not played locally. Instead, audio data is sent from a sender device to a recipient device and played only on the recipient device. In another aspect, rather than sending audio date, pre-recorded audio or synthesized audio is stored on a remote, networked resource ("in the cloud") or on the recipient device so that only a selection (e.g., indication) of the word/phrase is send from the sender device to a recipient device. The recipient device can play the locally stored audio or retrieved the audio from the remove, networked resource. The audio or selection that is send can be selected using predetermined input, such as a predetermined key or key combination, motion gesture, touch gesture or a graphical user interface (GUI) selection. The predetermined input may be context-sensitive, i.e. the phone application of the sender device may monitor for a plurality of predetermined inputs for sending the audio or audio selection only while a voice call is in-progress/active.

In accordance with an example embodiment of one aspect of the present disclosure, there is provided a method of augmenting a voice call with supplemental audio, the method comprising: receiving predetermined input on a first mobile device during a voice call established between the first mobile device and a second mobile device; determining an audio segment corresponding to the predetermined input; and sending the audio segment from the first mobile device to the second mobile device over a communications network during the voice call.

In accordance with another example embodiment of one aspect of the present disclosure, there is provided a method of augmenting a voice call with supplemental audio on an electronic device, the method comprising: receiving predetermined input on the electronic device during a voice call established between a first mobile device and a second mobile device; determining an audio segment corresponding to the predetermined input; and sending an indication of the audio segment from the first mobile device to the second mobile device over a communications network during the voice call.

In accordance with a further example embodiment of one aspect of the present disclosure, there is provided a method of augmenting a voice call with supplemental audio on an electronic device, the method comprising: receiving predetermined input on the electronic device during a voice call established between a first mobile device and a second mobile device; determining a designated phrase corresponding to the designated input; and sending an indication of the designated phrase from the first mobile device to the second mobile device over a communications network during the voice.

In accordance with an example embodiment of another aspect of the present disclosure, there is provided an electronic device, comprising: a processor; a memory coupled to the processor, the memory storing executable instructions that, when executed by the processor, cause the electronic device to perform the methods described herein.

In accordance with an example embodiment of a further aspect of the present disclosure, there is provided a system comprising an electronic device of a caller and an electronic device of a call recipient, each of the electronic devices comprising: a processor; a memory coupled to the processor, the memory storing executable instructions that, when executed by the processor, cause the electronic device to perform the methods described herein.

In accordance with an example embodiment of yet a further aspect of the present disclosure, there is provided a non-transitory machine readable medium having tangibly stored thereon executable instructions that, when executed by a processor of an electronic device, cause the electronic device to perform the methods described herein.

The following detailed description refers to the accompanying drawings. Wherever possible, the same reference numbers are used in the drawings and the following description to refer to the same or similar parts. While several example embodiments are described herein, modifications, adaptations, and other implementations are possible. For example, substitutions, additions, or modifications may be made to the components illustrated in the drawings, and the example methods described herein may be modified by substituting, reordering, or adding steps to the disclosed methods. Accordingly, the foregoing general description and the following detailed description provide examples only and are not intended to be limiting. Instead, the proper scope is defined by the appended claims.

In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and components have not been described in detail so as not to obscure the example embodiments described herein.

Example Communication System

Reference is first made to FIG. 1 which shows in schematic block diagram form a communication system 100 in which example embodiments of the present disclosure can be applied. The communication system 100 comprises a plurality of mobile wireless communication devices ("mobile devices") 102 connected to a wireless network 101. The wireless network 101 may be any type of wireless network capable of enabling a plurality of communication devices to wirelessly exchange data such as, for example, a wireless Wide Area Network (WAN) 102 such as a cellular network, a wireless local area network (WLAN) 104 such as Wi-Fi™, or a wireless personal area network (WPAN) (not shown), such as Bluetooth™ based WPAN. The wireless network 101 may comprise a plurality of the aforementioned network types coupled via appropriate methods known in the art. The mobile device 102 may be configured to communicate over all of the aforementioned network types and to roam between different networks.

The communication system 100 also comprises a wireless network gateway 110 with connects the mobile devices 102 to the Internet 112, and through the Internet 112 to a wireless connector system, such as an enterprise server 120. The wireless network gateway 110 provides translation and routing services between the enterprise server 120 and the WAN 102, which facilitates communication between the mobile devices 102 and other devices (not shown) connected, directly or indirectly, to the wireless network 101. Accordingly, communications sent via the mobile devices 102 are transported via the wireless network 101 to the wireless network gateway 110. The wireless gateway 110 forwards the communication to the enterprise server 120 via the Internet. Communication sent from the enterprise server 120 are received by the wireless network gateway 110 and transported via the wireless network 101 to the mobile devices 102.

The wireless WAN 102 may be implemented as a packet-based cellular network that includes a plurality of transceiver base stations 108 (one of which is shown in FIG. 1) where each of the base stations 108 provides wireless Radio Frequency (RF) coverage to a corresponding area or cell. The wireless WAN 102 is typically operated by a cellular network service provider that provides subscription packages to users of the mobile devices 102.

The WLAN 104 comprises a wireless network which, in some embodiments, conforms to IEEE 802.11x standards (sometimes referred to as Wi-Fi®). Other communication protocols may be used for the WLAN 104 in other embodiments. The WLAN 104 includes one or more wireless RF Access Points (AP) 114 (one of which is shown in FIG. 1) that collectively provide a WLAN coverage area. The WLAN 104 is operated by an enterprise (for example, a business or university) and the access points 114 are connected to an access point (AP) interface 116 in the shown embodiment. The AP interface 116 provides translation and routing services between the access points 114 and the enterprise server 120 to facilitate communication between two or more of the mobile devices 102 and other devices (not shown) connected, directly or indirectly, to the enterprise server 120. The AP interface 116 may be implemented using a computer, for example, a server running a suitable computer program or software.

The enterprise server 120 may be implemented as one or more server modules, and is typically located behind a firewall 114. The enterprise server 120 provides the mobile devices 102 with access to an organization's internal network referred to as an enterprise network 124 and provides administrative control and management capabilities over users and mobile devices 102 which may connect to the enterprise network 124. The enterprise server 120 is dedicated to managing communications to and from a set of managed mobile devices 102 (the enterprise mobile devices 102) so that enterprise mobile devices 102 are each enabled to exchange electronic messages and other information with resources and devices (e.g., computers) connected to the enterprise network 124.

The enterprise server 120 allows the enterprise mobile devices 102 to access resources of the enterprise network 124 including a personal information manager (PIM) server 132 such as, for example, Microsoft Exchange™, for connecting to an enterprise messaging system, an Internet server 134 for connecting to the Internet, and an application server 136 for implementing enterprise applications or for accessing other servers. The PIM server 132 provides messaging, calendar, task and address book functions. The enterprise server 120 is configured to direct or redirect email messages, instant messages (IM) and other corporate data received from the wireless network 101 and internally within the enterprise network 124 to be addressed to the mobile devices 102.

The wireless network gateway 110 is adapted to route data packets received from the mobile device 102 over the wireless network 101 to destination email and/or PIM server 132, Internet/Web servers 134, and one or more application servers 134 through the mobile data delivery module, and to route data packets received from the servers 132, 134, 136 through the mobile data delivery module over the wireless network 101 to a destination mobile device 102. The wireless network gateway 110 forms a connection or bridge between the servers 132, 134, 136 and wireless networks associated with wireless e-mail communication and/or Internet access.

The enterprise network 124 may comprise a private local area network, wide area network, or combinations thereof. Typically, the enterprise network 124 is an intranet of a corporation or other organization. The enterprise server 120 may also provide access to other public or private communication networks such as the Internet 112. A plurality of enterprise computers 130 (one of which is shown in FIG. 1), such as desktop or notebook computers, are connected to the enterprise network 124 by a wired connection or through a WLAN access point interface 116.

It will be appreciated that the above-described communication system is provided for the purpose of illustration only, and that the above-described communication system comprises one possible communication network configuration of a multitude of possible configurations for use with the devices 102. Suitable variations of the communication system will be understood to a person of skill in the art and are intended to fall within the scope of the present disclosure.

Example Mobile Device 102

Figure 2:
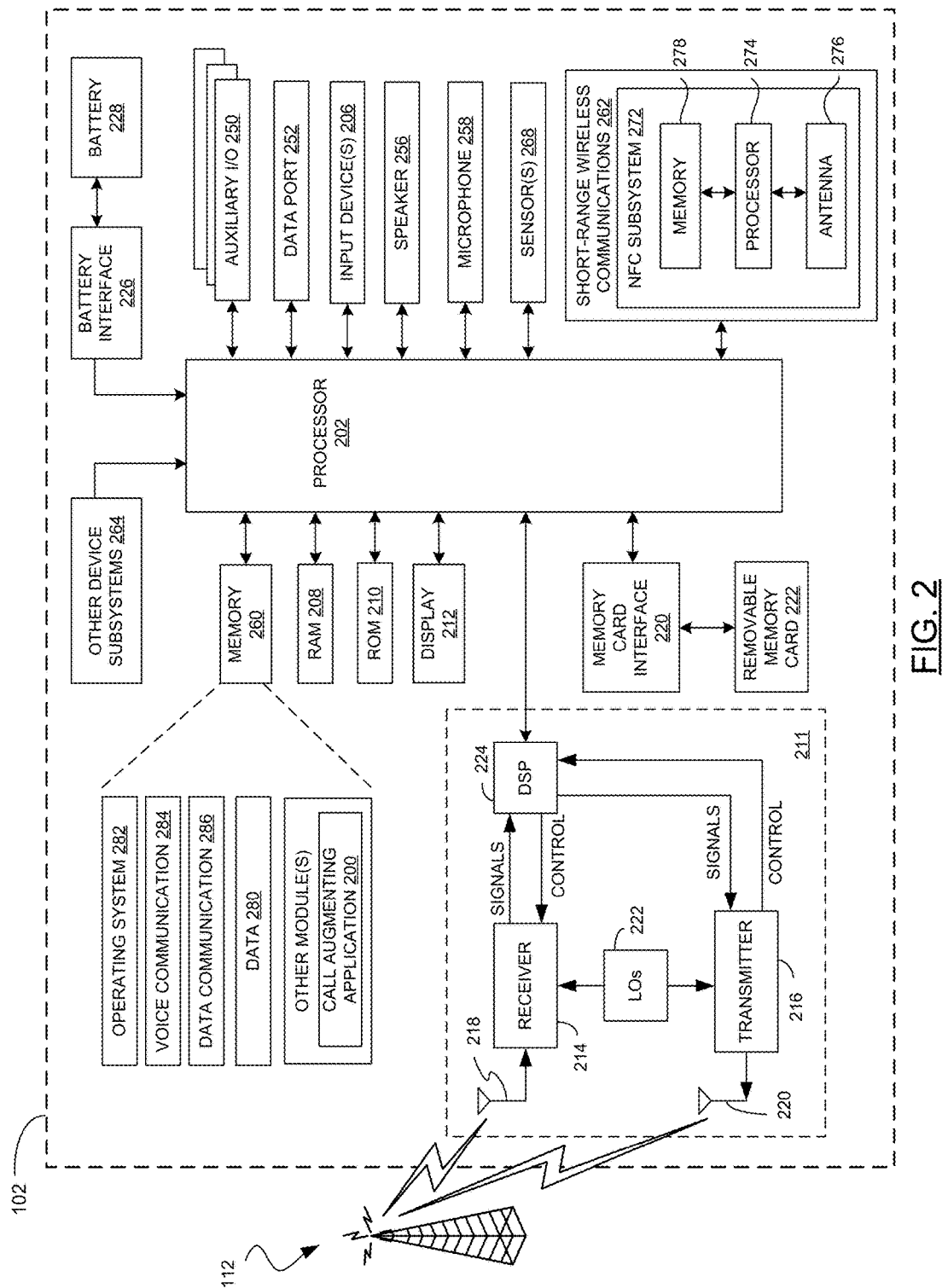
FIG. 2 is a schematic block diagram illustrating a mobile wireless communication device that may be used with the wireless communication system of FIG. 1.

Reference is next made to FIG. 2 which illustrates in simplified block diagram form a mobile device 102 in which example embodiments described in the present disclosure may be applied. The mobile devices 102 may include, but are not limited to, one or more handheld devices, such as smartphones or tablets, one or more laptop or notebook computers (also known as a netbook or ultrabook computer depending on the device capabilities), or possibly one or more vehicles having an embedded-wireless communication system, such as a Wi-Fi™ or cellular equipped in-dash infotainment system. The mobile devices 102 may include devices equipped for cellular communication, mobile devices equipped for Wi-Fi™ communications, or dual-mode devices capable of both cellular and Wi-Fi™ communications. In addition to cellular and Wi-Fi™ communications, the mobile devices 102 may also be equipped for Bluetooth™ and/or NFC (near-field communication) communications.

The mobile device 102 illustratively includes a rigid case or housing (not shown) which carries the electronic components of the mobile device 102. The housing may be elongated vertically, or may take on other sizes and shapes (including clamshell housing structures). The mobile device 102 includes a controller comprising at least one processor 202 (such as a microprocessor) which controls the overall operation of the mobile device 102.

The processor 202 interacts with other components, such as input device(s) 206, Random Access Memory (RAM) 208, Read Only Memory (ROM) 210, wireless communications subsystem 211 for exchanging radio frequency signals with a wireless network that is part of the network 112, a display 212 such as a color liquid crystal display (LCD) or active-matrix organic light-emitting diode (AMOLED) display, persistent (non-volatile) memory 260 which may be flash erasable programmable read only memory (EPROM) memory (flash memory) or other suitable form of memory, sensor(s) 268 such as a motion sensor, an orientation sensor and/or proximity sensor, auxiliary input/output (I/O) subsystems 250, data port 252 such as serial data port (e.g., Universal Serial Bus (USB) data port), speaker 256, microphone 258, a short-range communications subsystem 262, and other device subsystems 264 such as a camera, global positioning system (GPS), vibrator or light-emitting diode (LED) notification light. The components of the mobile device 102 are coupled via a communications bus (not shown) which provides a communication path between the various components.

The input device(s) 206 may include a keyboard or keypad, one or more buttons, one or more switches, a touchpad, a rocker switch, a thumbwheel, or other type of input device. In addition to or instead of a keyboard or keypad, the display 212 may be provided as part of a touchscreen or touch-sensitive display which provides an input device 206. The display 212 which together with a touch-sensitive overlay (not shown) operably coupled to an electronic controller (not shown) may comprise the touch-sensitive display. The touch-sensitive display is typically a capacitive touch-sensitive display which includes a capacitive touch-sensitive overlay.

User-interaction with a GUI presented on the display 212 performed using the input devices 206. Information, such as text, characters, symbols, images, icons, and other items are rendered and displayed on the display 212 via the processor 202. The processor 202 may interact with one or more sensors 268, such as the orientation sensor to detect direction of gravitational forces or gravity-induced reaction forces so as to determine, for example, the orientation of the mobile device 102 in order to determine a screen orientation for the GUI.

Operating system software 282 executed by the processor 202 is stored in the persistent memory 260, such as flash memory, but may be stored in other types of memory devices, such as ROM 210 or similar storage element. User data 280 is also stored in the persistent memory 260. System software, software modules, specific device applications, or parts thereof, may be temporarily loaded into a volatile store, such as RAM 208, which is used for storing runtime data variables and other types of data or information. Communications signals received by the mobile device 102 may also be stored in the RAM 208. Although specific functions are described for various types of memory, this is merely one example, and a different assignment of functions to types of memory may be used in other embodiments.

The processor 202, in addition to its operating system functions, enables execution of software applications on the mobile device 102. A predetermined set of applications or software modules that control basic device operations, such as voice communications module 284, data communications module 286, may be installed on the mobile device 102 during manufacture. The data 280 includes installed applications and user data, such as saved files, among other data. The installed applications in the data 280 include a call augmenting application 200 that, when executed by the processor 202, causes the operations of the below-described methods to be performed. The call augmenting application 200 may be part of a telephone (or calling) application or may interface with it.

A PIM application may be installed during manufacture. The PIM may be capable of organizing and managing data items, such as email, calendar events, voice mails, appointments, and task items. The PIM application may also be capable of sending and receiving data items via the wireless network. The PIM data items may be seamlessly integrated, synchronized and updated via the wireless network with corresponding data items stored or associated with a host computer system. New applications and updates to installed applications may be installed by the user, for example, via the Internet.

The mobile device 102 is a two-way wireless Radio Frequency (RF) communications device having data and/or voice communications capabilities. In addition, the mobile device 102 may have the capability to communicate with other computer systems via the Internet. The wireless communication subsystem 211 exchanges radio frequency signals with the wireless network. The wireless communication subsystem 211 comprises a wireless Wide Area Network (WAN) communication subsystem for two-way communication with a wireless WAN, such as a cellular network. The mobile device 102 may communicate with any one of a plurality of fixed transceiver base stations (not shown) of the wireless network within its geographic coverage area. The mobile device 102 may send and receive communication signals over the wireless network after the required network registration or activation procedures have been completed. In addition, the wireless communication subsystem 211 may comprise a Wireless Local Area Network (WLAN) communication subsystem for two-way communication with a WLAN via wireless access points (not shown), e.g. Wi-Fi™.

Communication functions, including data and voice communications, are performed through the communications subsystem 211 and possibly through the short-range communications subsystem 262 (e.g., using the NFC subsystem 272). Data received by the mobile device 102 may be decompressed and decrypted by a decoder (not shown). The communications subsystem 211 includes a receiver 218, a transmitter 216, and one or more antennas 218 and 220. In addition, the communications subsystem 211 also includes a processor, such as a digital signal processor (DSP) 224, and local oscillators (LOs) 222. The specific design and implementation of the communications subsystem 211 is dependent upon the wireless communications networks in which the mobile device 102 is intended to operate.

Network access requirements vary depending upon the type of communication system. For example, in GPRS networks, network access is associated with a subscriber or user of a device. The mobile device 102 also includes a memory card interface 220 for receiving a removable memory card 222 comprising persistent memory, such as flash memory, having subscriber identity data stored thereon. The memory card 222 may be inserted in or coupled to the memory card interface 220 for storing and reading data by the processor 202.

When required network registration or activation procedures have been completed, the mobile device 102 may send and receive communications signals over the communication network. Signals received by the antenna 218 through the wireless network are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 224. In a similar manner, signals to be transmitted are processed, including modulation and encoding, for example, by the DSP 224. These DSP-processed signals are input to the transmitter 216 for digital-to-analog (D/A) conversion, frequency up conversion, filtering, amplification, and transmission to the wireless network via the antenna 220.

In addition to processing communications signals, the DSP 224 provides for control of the receiver 214 and the transmitter 216. For example, the gains applied to communication signals in the receiver 214 and the transmitter 216 may be adaptively controlled through automatic gain control algorithms implemented in the DSP 224.

In a data communications mode, a received signal, such as a text message or web page download, is processed by the communications subsystem 211 and is input to the processor 202. The received signal is then further processed by the processor 202 for an output to the display 212, or alternatively to some other auxiliary I/O device 250. The mobile device 102 may also be used to compose data items, such as email messages, using the input device(s) 206 and/or some other auxiliary I/O device 250. The composed data items may then be transmitted over the wireless network via the communications subsystem 211.

In a voice communications mode, overall operation of the device is substantially similar to the data communications mode, except that received signals are output to a speaker 256, and signals for transmission are generated by a microphone 258. Alternative voice or audio I/O subsystems, such as a voice message recording subsystem, may also be implemented on the mobile device 102. In addition, the display 212 may also be utilized in voice communications mode, for example to display the identity of a calling party, the duration of a voice call, or other voice call related information.

The short-range communications subsystem 262 enables communication between the mobile device 102 and other proximate systems or devices, which need not necessarily be similar devices. The short-range communications subsystem 262 includes an NFC subsystem 272 for communicating with another mobile wireless communications device via NFC communications. The NFC subsystem 272 may also be used for communicating with an NFC device or NFC tag via NFC communications.

The short-range communications subsystem 262 may also include devices, associated circuits and components for providing other types of short-range wireless communication such as Bluetooth™, IEEE 802.11, IEEE 802.15.3a (also referred to as UltraWideband (UWB)), Z-Wave, ZigBee, or infrared such as an Infrared Data Association (IrDA) communications, as well as a corresponding communications module in persistent memory 260 to provide for communication with similarly-enabled systems and devices.

The mobile device 102 also includes a battery 228 as a power source, which is typically one or more rechargeable batteries that may be charged, for example, through charging circuitry coupled to a battery interface such as the serial data port 252. The battery 228 provides electrical power to at least some of the components of the mobile device 102, and the battery interface 226 provides a mechanical and electrical connection for the battery 228. The battery interface 226 is coupled to a regulator (not shown) which provides power V+ to the circuitry of the mobile device 102.

Method of Augmenting a Voice Call with Supplemental Audio

Figure 3:
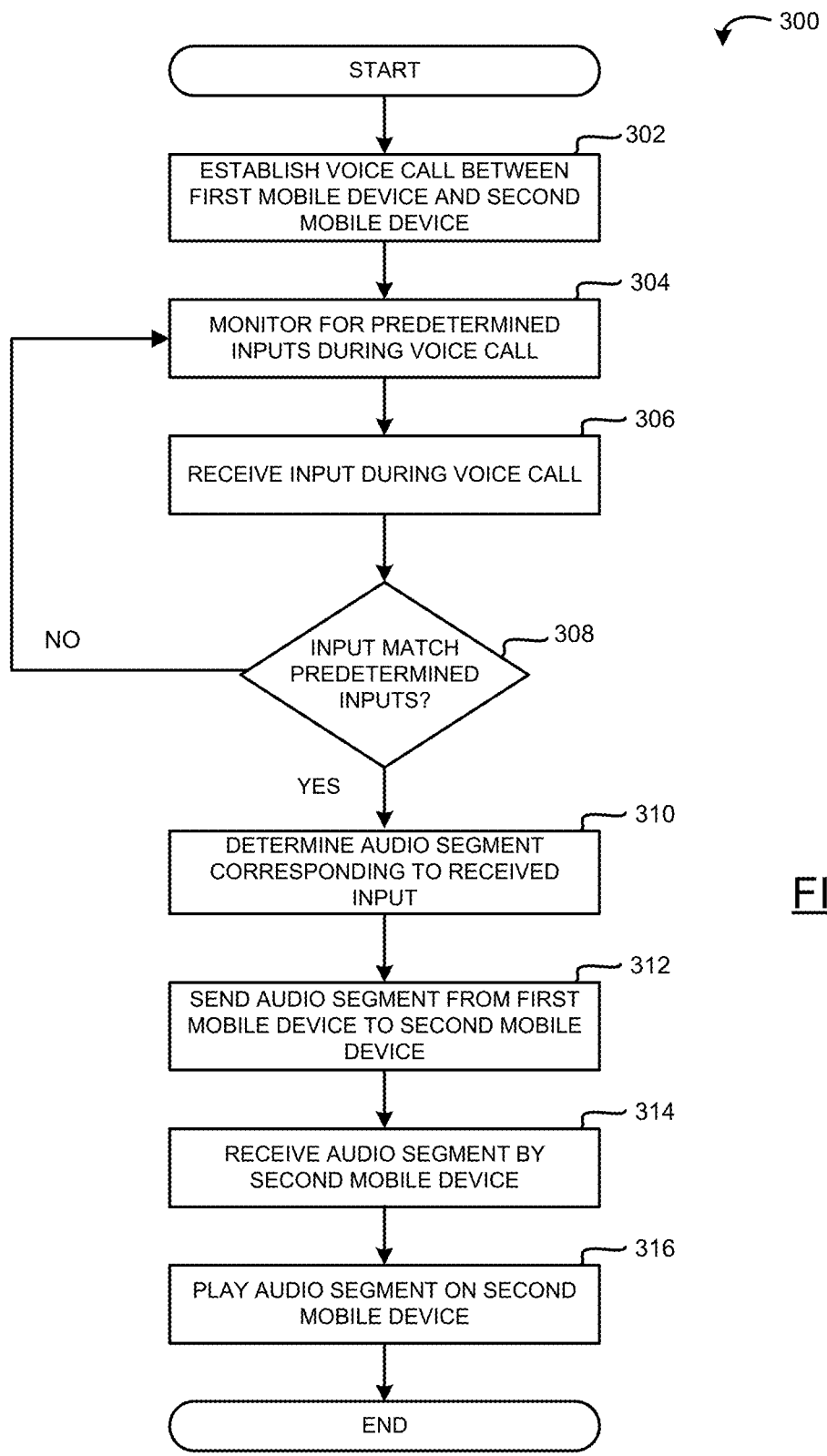
FIG. 3 is a flowchart illustrating an example embodiment of a method of augmenting a voice call with supplemental audio in accordance with a first embodiment of the present disclosure.

FIG. 3 shows an example flowchart of a method 300 of augmenting a voice call with supplemental audio in accordance with a first example embodiment of the present disclosure. The method may be carried out by software executed, for example, by a processor 202 of a mobile device 102.

At 302, a voice call is established between a first mobile device and a second mobile device, for example, over a voice channel of a cellular network. The mobile device 102, described above, is an example of a suitable mobile construction for the first mobile device and second mobile device.

At 304, during the voice call, the first mobile device monitors for a plurality of predetermined inputs for augmenting the voice call. The predetermined inputs may be a key or key combination of hardware keyboard or software keyboard (i.e., an onscreen screen keyboard displayed on a touchscreen of the first mobile device), a motion gesture detected by a motion sensor of the first mobile device, a touch gesture (e.g., a swipe in a predetermined direction) detected by a touchscreen of the first mobile device, or other GUI selection (e.g., a selection of a corresponding menu option of the GUI of the first mobile device via user interaction therewith).

Figure 8:
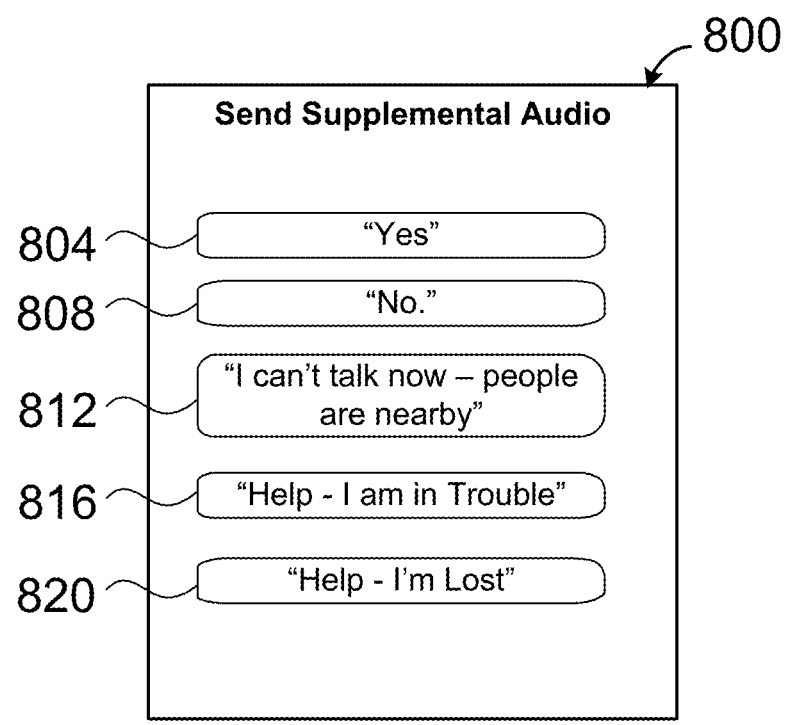
FIG. 8 a diagrammatic view of a supplemental audio user interface window in accordance with one example embodiment of the present disclosure.

With respect to GUI selection, a user interface screen (e.g., menu, window or dialog box) with the available audio segments may be displayed on the display of the first mobile device in response to designated received input, and the user may select one of the audio segments from the available audio segments using designated input. FIG. 8 shows a diagrammatic view of a supplemental audio user interface window 800 in accordance with one example embodiment of the present disclosure. The supplemental audio user interface window 800 may be an overlay or "popup" window at least partially overlaying the current user interface screen, such as a "Called Connected Screen" of the telephone application or other active application on the first mobile device. In the shown example, the supplemental audio user interface window 800 includes 5 available audio segments from which an audio segment to be sent to the second mobile device may be selected. The available audio segments options are present as onscreen buttons and include a button 804 of "Yes", a button 808 for "No", a button 812 for "I can't talk now—people are nearby", a button 816 for "Help—I am in Trouble", and a button 820 for "Help—I am Lost". The user can select one of the options using designated input (e.g., touching a corresponding location on a touchscreen, pressing a corresponding key in a keyboard, etc.).

At 306, during the voice call, input is received from the first mobile device via an input device, such as a keyboard, touchscreen or motion sensor.

At 308, the processor 202 of the first mobile device determines whether the received input is one of the plurality of predetermined inputs for augmenting the voice call. If the received input is not one of the plurality of predetermined inputs for augmenting the voice call, the input may be processed if it is another input recognized by the first mobile device during a voice call or else the input is ignored.

At 310, when the received input is one of the plurality of predetermined inputs for augmenting the voice call, the processor 202 determines an audio segment corresponding to the predetermined input. The memory 260 of the first mobile device stores a logical mapping (or logical association) between a plurality of audio segments and a unique predetermined input assigned to each of the audio segments. The local mapping may be stored by the call augmenting application 200 in a dedicated memory area. The plurality of audio segments is also stored in the memory 260, for example, by the call augmenting application 200 in the dedicated memory area.

Each of the audio segments typically comprises one or more words or numbers. That is, each audio segment is either a word, a phrase, a number or a number string. The audio segments may be pre-recorded audio. The pre-recorded audio may be previously recorded by the user, for example, in the user's own voice. This allows the audio segments, when used to augment a voice call with supplemental audio as described below, to sound more natural and less jarring to the user of the second mobile device.

Alternatively, in other embodiments, the pre-recorded audio may be previously recorded by the user in another person's voice or may be pre-recorded audio obtained from another source, such as an audio clip from a song, movie, TV show or other audio recording downloaded from the Internet or other content source, a tone (e.g., ring tone), or other audio.

Alternatively, in yet other embodiments, the pre-recorded audio may be synthesized audio based on text-to-speech synthesis, possibly in the voice of the user of the first mobile device using pre-recorded voice samples of the user's voice which may be stored locally in the memory 260 of the first mobile device.

The audio segments relate to private information, personal safety issue, or other information the user may want to convey to another party without local parties hearing. The private information includes, for example, any one or more of a credit card number, CVV number (Card Verification Value), debit card number, personal identification number (PIN), user name, password, telephone number, electronic messaging address, street address, social security number/social insurance number or the like, or other personal or business information deemed to be confidential, private or sensitive. The audio segments may relate to personal safety issue including, for example, "Help I'm in trouble", "I am currently here: <script to insert users GPS location>", "I can't talk about that right now—people are nearby", "I think I'm being followed", and "Yes", "No". Speed, velocity or related vector information could be included with the GPS data, for example, if the device 102 is determined to be travelling or otherwise in motion (which could be determined based on changes in GPS data, location services, or other suitable means). For example, the audio segment could be "I'm at x longitude and y latitude travelling north at z km/hour" if the user is trouble and travelling, where x and y are latitude and longitude (e.g., determined using a GPS subsystem) and z is the speed determined (e.g., determined by a speed sensor, changes in GPS data, or other suitable means).

As noted above, some of the audio segments or designated phrases may be associated with other data that may be called, for example, by script. For example, audio segments (or designated phrases) may be associated with GPS location data, in which case the call augmenting application 200 obtains the GPS location data from the GPS subsystem of the first mobile device (e.g. in terms of Latitude and Longitude), converts the GPS location data into audio using text-to-speech synthesis, and appends the synthesized audio segment to the selected audio segment, which itself could be a synthesized audio segment. GPS location data could be provided, for example, in an emergency call which may be faster and more accurate than triangulation which is conventionally used in emergency call. It will be appreciated that when the voice call is an emergency call, the recipient may not be a mobile device but a wired telephone connected to the public switched telephone network (PSTN) or a (VoIP) VoIP phone.

Scripts for data other than GPS location data may also be provided in other embodiments, and the call augmenting application 200 will convert the data into audio using text-to-speech synthesis, and append the synthesized audio segment to the selected audio segment, which itself could be a synthesized audio segment, in the same manner as for GPS location data, as described above.

One or more security levels may be associated with the plurality of audio segments. The security levels may be assigned to the plurality of audio segments based on user input or based on one or more rules. The rules may be heuristic rules that analyze the content of the audio segments and/or designated phrases contained within the audio segments. If designated phrases contained within the audio segments are provided to the call augmenting application 200, the call augmenting application 200 can determine the designated phrases contained within the audio segments (e.g., user recorded audio segments) using speech-to-text synthesis techniques which are known in the art and will not be described herein.

In one example, two security levels are recognized: sensitive and not sensitive. The security levels are assigned to audio segments based on whether the audio segments relate to designated phrases determined to be sensitive or not sensitive. For example, identifying information such as credit card number, CVV number (Card Verification Value), debit card number, personal identification number (PIN), user name, password, telephone number, electronic messaging address, street address, social security number/social insurance number or the like, may be determined to be sensitive, whereas other data may be determined to be not sensitive.

When an audio segment is determined to be sensitive, the call augmenting application 200 may require confirmatory input from the user before it is sent to the second mobile device. In one embodiment, the call augmenting application 200 may cause a prompt to be displayed on the display of the first mobile device, the prompt requesting confirmatory input from the user before the audio segment is sent to the second mobile device. The confirmatory input could be selecting an onscreen button (e.g., "Confirm OK to Send <insert audio segment>") that may be selected using designated input (e.g., touching a corresponding location on a touchscreen), entering a requested confirmation message via keyboard, or other confirmatory input. If the confirmatory input is not entered (including an incorrect entry in response to the requested confirmation message), the first mobile device will not send the audio segment. In some examples, a timeout feature may be provided in which case the send operation is cancelled if the confirmatory input is not received within an allotted time and operations return to 304.

In another embodiment, the call augmenting application 200 may require increased complexity in the predetermined input mapped to sensitive audio segments. For example, the minimum number and/or complexity of keys that make up a predetermined key combination may be increased for audio segments that are sensitive relative to audio segments that are not sensitive. Complexity can be determined in a number of ways, including the presence of special characters or keys, for example, corresponding to symbols or upper case characters rather than basic alphanumeric characters/keys). In one example, sensitive audio segments require a minimum of three keys whereas sensitive audio segments require only one key. In yet another example, three keys for a sensitive audio segment must include at least one symbol whereas non-sensitive audio segments do not require any symbols.

In a further embodiment, the call augmenting application 200 may require increased complexity in the predetermined input mapped to sensitive audio segments as well as confirmatory input from the user before the audio segment is sent to the second mobile device.

In yet another example, more than two security levels are recognized. For example, the security levels may be low, medium and high. When the security level is low, no restrictions are placed on the predetermined input mapped to the audio segments and no confirmatory input is required. When the security level is medium, restrictions are placed on the predetermined input mapped to the audio segments or confirmatory input is required. When the security level is high, restrictions are placed on the predetermined input mapped to the audio segments and confirmatory input is required.

At 312, the determined audio segment is sent from the first mobile device to the second mobile device over the wireless network 101, for example, over a data channel between the first mobile device to the second mobile device separate from the voice channel for the voice call. At 314, the second mobile device receives the determined audio segment sent by the first mobile device.

At 316, the second mobile device plays the received audio segment via a speaker 256 of the second mobile device during the voice call. In some embodiments, the received audio segment is played over audio from the voice call so that both the received audio segment is played at the same time as the audio from the voice call. In other embodiments, the received audio segment is played interweaved (or spliced) between audio from the voice call so that the received audio segment is played a different time than the audio from the voice call.

Figure 4:
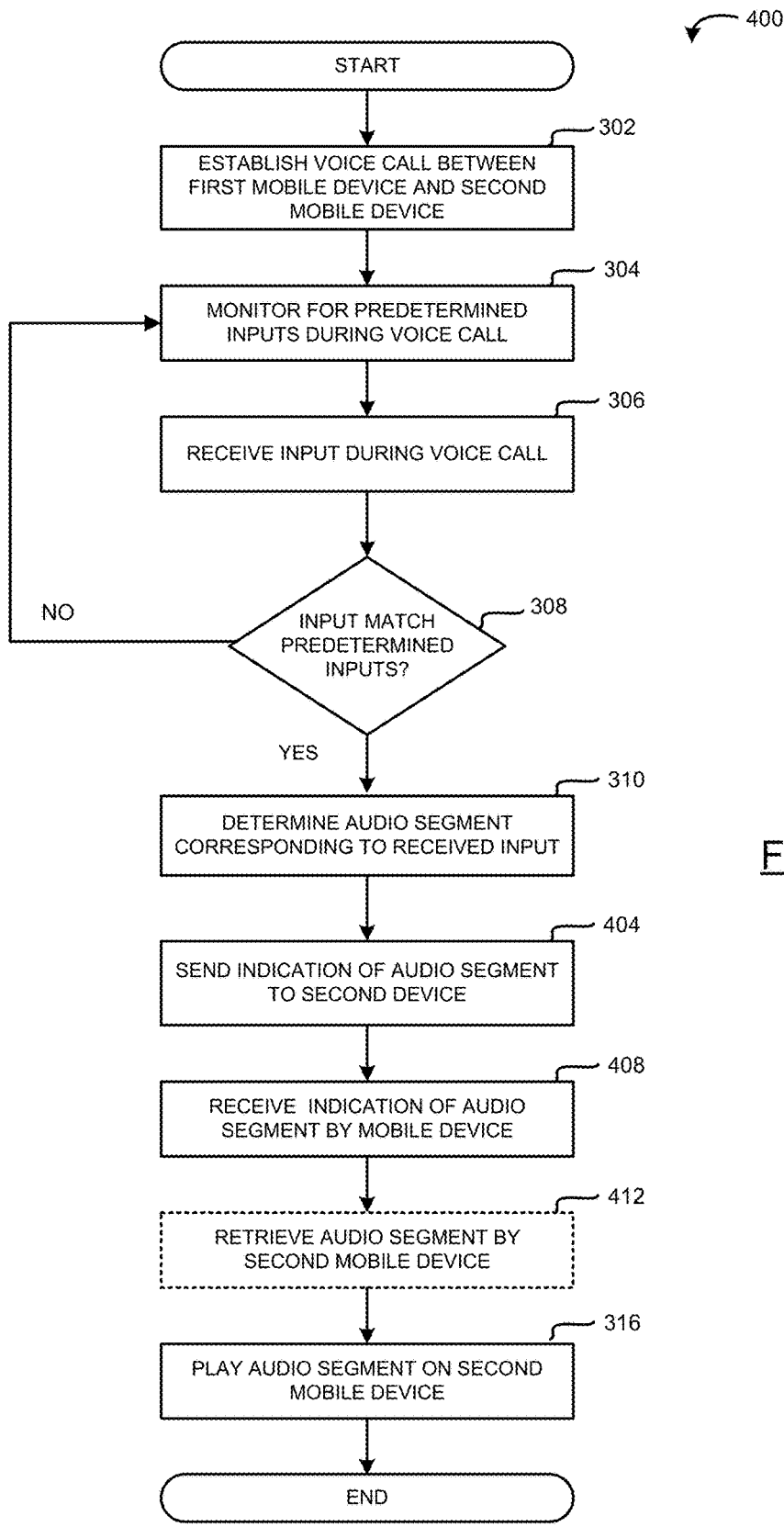
FIG. 4 is a flowchart illustrating an example embodiment of a method of augmenting a voice call with supplemental audio in accordance with a second embodiment of the present disclosure.

FIG. 4 shows an example flowchart of a method 400 of augmenting a voice call with supplemental audio in accordance with a second example embodiment of the present disclosure. The method is similar to the method 300 except that an indication of the audio segment is sent to the second mobile device rather than the audio segment itself. The method may be carried out by software executed, for example, by a processor 202 of a mobile device 102.

Operations 302-310 proceed as described above in connection with the method 300. However, the audio segments are not stored locally on the first mobile device or are stored elsewhere in addition to being stored locally on the first mobile device. The audio segments are stored in a memory of a remote, networked resource ("in the cloud") available to the second mobile device (e.g., a shared content or media server) or in the memory of the second mobile device. For example, the audio segments may be generated or selected by the user of the first mobile device on the first mobile device or other communications device and stored in the memory of the remote, networked resource or in the memory of the second mobile device for later use. This may reduce or eliminate any latency that may be otherwise be caused when augmenting a voice call with supplemental audio when the audio segment is transmitted from the first mobile device to the second mobile device. This may be particularly advantageous when the second mobile device is a device with which the first mobile device frequently communicates, such as a family member, friend or work colleague.

At 404, an indication of the determined audio segment is sent from the first mobile device to the second mobile device over the wireless network 101. The indication may be any suitable form of identifying information from which the second mobile device can identify the determined audio segment. At 408, the second mobile device receives the indication of the determined audio segment sent by the first mobile device.

At 412, the second mobile device optionally retrieves the audio segment identified by the indication from the remote, networked resource over the wireless network via the data channel. When the audio segments are stored locally on the second mobile device, operation 412 is omitted.

At 316, the second mobile device plays the audio segment corresponding to the received indication) via a speaker 256 of the second mobile device during the voice call. In some embodiments, the received audio segment is played over audio from the voice call so that both the received audio segment is played at the same time as the audio from the voice call. In other embodiments, the received audio segment is played interweaved (or spliced) between audio from the voice call so that the received audio segment is played a different time than the audio from the voice call.

Figure 5:
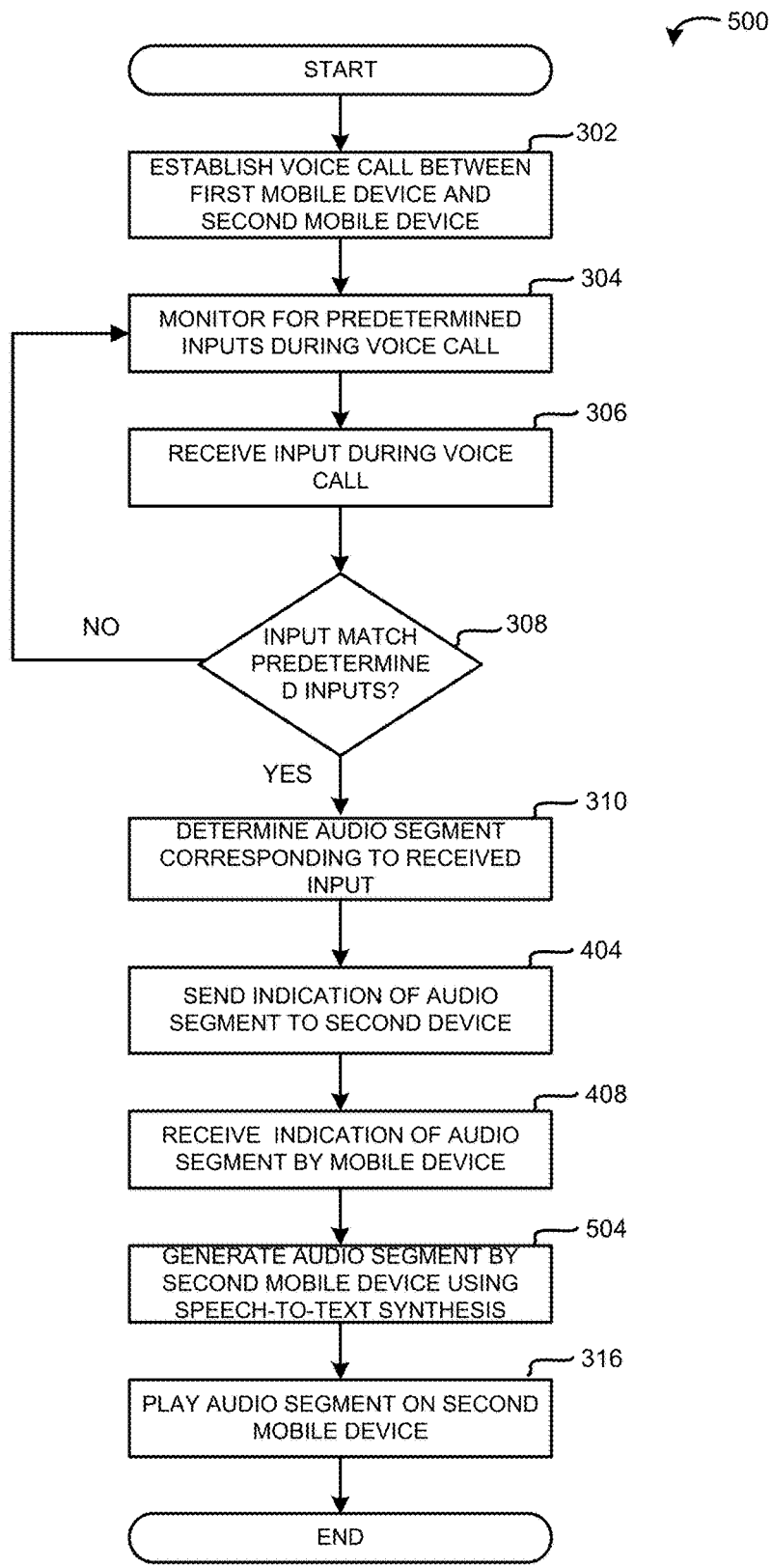
FIG. 5 is a flowchart illustrating an example embodiment of a method of augmenting a voice call with supplemental audio in accordance with a third embodiment of the present disclosure.

FIG. 5 shows an example flowchart of a method 500 of augmenting a voice call with supplemental audio in accordance with a third example embodiment of the present disclosure. The method is similar to the method 400 except that the audio segment is generated using text-to speech synthesis. The method may be carried out by software executed, for example, by a processor 202 of a mobile device 102.

Operations 302-408 proceed as described above in connection with the method 400. However, the audio segments are generated using text-to speech synthesis. At 504, after second mobile device receives the indication of the determined audio segment sent by the first mobile device, the processor 202 of the second mobile device performs text-to speech synthesis to generate synthesized audio segments corresponding to the determined audio segment, possibly in the voice of the user of the first mobile device using pre-recorded voice samples of the user's voice which may be stored locally in the memory 260 of the second mobile device or remotely in the remote, networked resource, in which case the necessary voice samples are first retrieved from the remote, networked resource.

Figure 6:
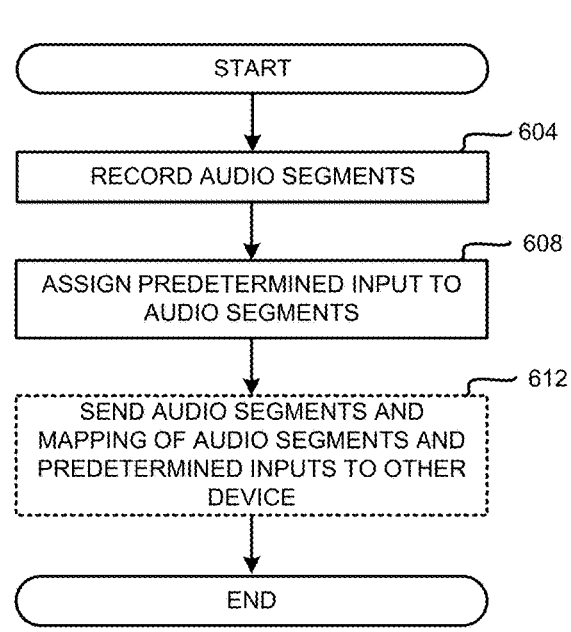
FIG. 6 is a flowchart illustrating an example embodiment of a method generating audio segments for use in augmenting a voice call with supplemental audio in accordance with a first embodiment of the present disclosure.

FIG. 6 is a flowchart illustrating an example embodiment of a method 600 generating audio segments for use in augmenting a voice call with supplemental audio in accordance with a first embodiment of the present disclosure. The method may be carried out by software executed, for example, by a processor 202 of a mobile device 102.

At 604, before establishing the voice call, a plurality of audio segments is recorded on the first mobile device via the microphone 258. As noted above, each of the audio segments is a word or a phrase. The audio segments are stored in the memory 260 of the first mobile device. The audio segments may be pre-recorded audio. The pre-recorded audio may be previously recorded by the user, for example, in the user's own voice. This allows the audio segments, when used to augment a voice call with supplemental audio as described below, to sound more natural and less jarring to the user of the second mobile device. Alternatively, the pre-recorded audio may be previously recorded by the user in another person's voice or may be pre-recorded audio obtained from another source, such as an audio clip from a song, movie, TV show or other audio recording downloaded from the Internet or other content source, a tone (e.g., ring tone), or other audio.

At 608, a predetermined input is assigned to each of the audio segments by the user via interaction with the GUI. As noted above, the predetermined inputs may be a predetermined key or key combination, motion gesture, touch gesture or a graphical user interface (GUI) selection. Each of the predetermined inputs assigned to the audio segments is unique among the predetermined inputs, thereby allowing different audio segments to be selected via different predetermined inputs. The first mobile device stores a logical mapping (or logical association) between the plurality of audio segments and the unique predetermined input assigned to each of the audio segments in the memory 260 along with the audio segments.

At 612, the first mobile device optionally sends the audio segments and to the logical mapping (or logical association) between the plurality of audio segments and the unique predetermined input assigned to each of the audio segments to the second mobile device for subsequent use. Alternatively, in other embodiments, the first mobile device sends the audio segments to a remote, networked resource via the wireless network 101 and sends the logical mapping to the second mobile device. The second mobile device may request the audio segments form the remote, networked resource (e.g., content server) in subsequent use when retrieving audio segments, and the remote, networked resource may then fetch requested audio segments for downloading by the second mobile device. Alternatively, the networked resource may send addressing information identifying an address at which the audio segments are stored to the second mobile device so that it may directly retrieved the audio segments in subsequent use.

Figure 7:
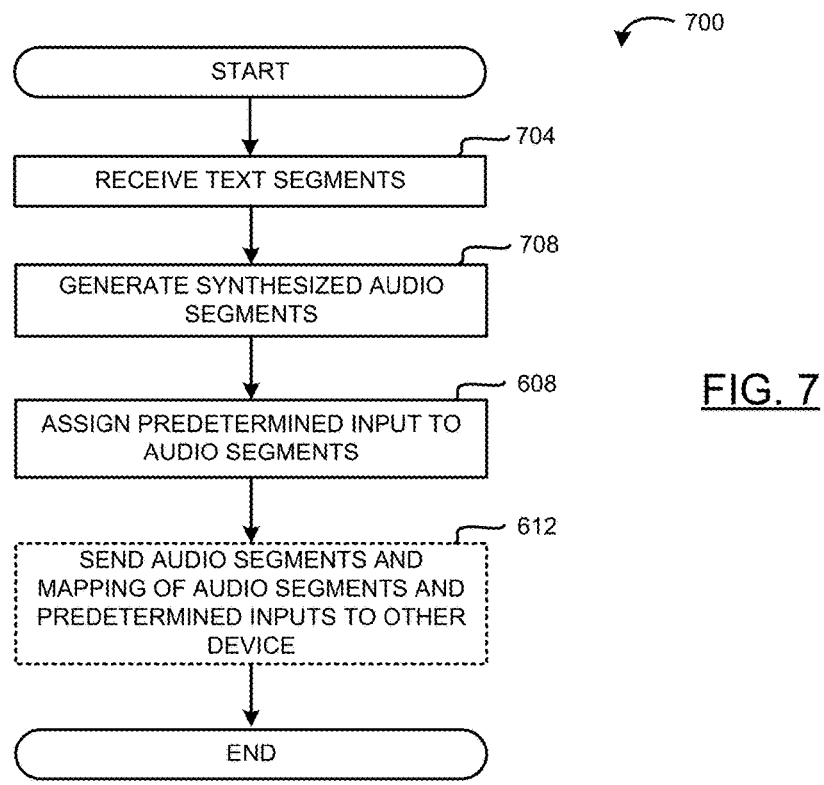
FIG. 7 is a flowchart illustrating an example embodiment of a method generating audio segments for use in augmenting a voice call with supplemental audio in accordance with a second embodiment of the present disclosure.

FIG. 7 is a flowchart illustrating an example embodiment of a method 700 generating audio segments for use in augmenting a voice call with supplemental audio in accordance with a first embodiment of the present disclosure. The method 700 is similar to the method 600 except that audio is generated using text-to-speech synthesis. The method may be carried out by software executed, for example, by a processor 202 of a mobile device 102.

At 704, before establishing the voice call, a plurality of text segments are received the first mobile device via a user input device, such as a hardware or software keyboard.

At 708, the processor 202 of the first mobile device performs text-to speech synthesis to generate synthesized audio segments corresponding to the text segments. Methods of text-to speech synthesis are well known in the art and will not be described herein. Any suitable method of text-to speech synthesis may be used. In some embodiments, the text-to speech synthesis may be performed in the voice of the user of the first mobile device using pre-recorded voice samples of the user's voice which may be stored locally in the memory 260 of the first mobile device.

Example use cases of the methods of the present disclosure will now be described. In a first use case, a telephone conversation has been started in a public place in which no private information needs to be shared between the parties. At some time during the conversation private information needs to be shared. This creates an awkward and time consuming situation because the user is unable to freely continue the conversation given the people in their current surroundings, and the party with private information to be shared must discontinue the conversation and/or end the call, or move to less public surroundings where no other persons can hear the conversation. Alternatively, the party with private information to be shared may feel compelled to sacrifice the privacy and security of their information by disclosing the private information in a public space rather than discontinuing the conversation and/or ending the call, or moving to less public surroundings where no other persons can hear the conversation. Also, from a personal safety perspective, there may be times that the parties need to quickly convey information over the phone without actually speaking and potentially alerting other threats nearby.

The present disclosure provides a solution that allows users to communicate words or phrases to the other phone conversation participants covertly/silently that does not require the users to speaking aloud, potentially exposing private information and/or alerting others around them as to the subject matter/sensitivity of their conversation. In the first embodiment, users are able to setup a set of pre-recorded audio segments (e.g., words, phrases or soundbites) that can be sent from a sender's phone to the phones of the other participants of a voice call without having the audio segments reproduced on the sender's mobile phone for others to potentially hear.

For example, take the use case in which there is a voice call with two participants Alice and Bob, and a third party Eve who is not a party to the voice call but is located within hearing distance of Bob. Alice, who is Bob's supervisor, and Bob are having a phone conversation in a work environment from their respective but distant workstation (e.g., cubicle).

The conversation is light and nothing sensitive is being discussed. At a certain point in the conversation, Alice starts asking questions to Bob about Bob's team member Eve. Eve's workstation is close enough to Bob that she can often hear his side of phone conversations with other people. Currently, Bob would need to verbally tell Alice over the phone that he cannot talk further about the current topic of conversation, which may arouse suspicion of parties who are in ear shot, such as Eve. The present invention allows Bob to cause Alice's phone to play one of his pre-recorded audio segments (e.g., "I can't talk about that now" without local parties like Eve hearing it—audio segment would only be played on Alice's phone. This provides a way for Bob to notify Alice that he cannot speak freely as he is at his desk and there are others who are around who may be listening.

The coding of software for carrying out the above-described methods described is within the scope of a person of ordinary skill in the art having regard to the present disclosure. Machine-readable code executable by one or more processors of one or more respective devices to perform the above-described method may be stored in a machine-readable medium such as a memory of the mobile device 102.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. For example, the methods may be implemented in software stored in a pre-recorded storage device or other similar machine readable medium having executable program instructions stored thereon for performing the methods described herein, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods may be implemented in hardware components or combinations of hardware and software such as, for example, ASICs, special purpose computers, or general purpose computers.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method of augmenting a voice call between a first mobile device and a second mobile device with supplemental audio, the method comprising:
providing a plurality of audio segments stored in a persistent memory of the first mobile device, wherein each audio segment comprises at least one of private information, confidential information, sensitive information and personal safety information, wherein a unique input is assigned to each audio segment, wherein each audio segment has a sensitive security level or a non-sensitive security level, wherein the unique input assigned to each audio segment with a sensitive security level has a greater complexity than the unique input assigned the audio segments with the non-sensitive security level;
receiving input on the first mobile device during a voice call established between the first mobile device and the second mobile device over a voice channel; and
sending an audio segment corresponding to the input from the first mobile device to the second mobile device over a data channel between the first mobile device and the second mobile device during the voice call when the received input matches the unique input assigned to one of the plurality of audio segments, wherein the second mobile device plays the audio segment via a speaker of the second mobile device during the voice call after being received.

2. The method of claim 1, wherein the audio segment comprises one or more words.

3. The method of claim 1, wherein the audio segment comprises pre-recorded audio segments of a user of the first mobile device in the user's own voice.

4. The method of claim 3, further comprising:
before establishing the voice call:
recording, on the first mobile device, the plurality of audio segments via a microphone of the first mobile device; and
storing the audio segments and the assigned unique inputs in the persistent memory of the first mobile device.

5. The method of claim 1, wherein the audio segment comprises synthesized audio based on text-to-speech synthesis.

6. The method of claim 5, further comprising:
before establishing the voice call:
receiving, on the first mobile device, a plurality of text segments via a user input device;
performing, on the first mobile device, text-to speech synthesis to generate synthesized audio segments corresponding to the text segments;
assigning a unique input to each of the synthesized audio segments; and
storing the synthesized audio segments and the assigned unique inputs in the persistent memory of the first mobile device.

7. The method of claim 1, wherein the input is a designated key or key combination.

8. The method of claim 1, wherein the second mobile device plays the audio segment over audio from the voice call.

9. The method of claim 8, wherein the audio corresponding to the received audio segment is combined with audio from the voice call so that the audio corresponding to the received audio segment is played at the same time as the audio from the voice call.

10. The method of claim 1, wherein the second mobile device plays the audio segment interweaved between audio from the voice call.

11. The method of claim 10, wherein the audio corresponding to the received audio segment is interweaved between audio from the voice call so that the audio corresponding to the received audio segment is played a different time than the audio from the voice call.

12. The method of claim 1, further comprising:
prompting for confirmatory input when the audio segment has a sensitive security level, wherein the audio segment is only sent when the confirmatory input is entered.

13. The method of claim 1, further comprising:
performing a script associated with the audio segment;
sending a result associated with the script to the second mobile device.

14. The method of claim 13, wherein the audio segment is associated with global positioning system (GPS) location data, and wherein performing the script associated with the audio segment comprises obtaining GPS location data from a GPS subsystem of the first mobile device.

15. The method of claim 14, wherein performing the script associated with the audio segment further comprises converting the GPS location data into an audio segment using text-to-speech synthesis, and appending the synthesized audio segment to the selected audio segment.

16. The method of claim 1, wherein the unique inputs assigned to the audio segments with the sensitive security level comprise a higher number of minimum key strokes than the unique inputs assigned to the audio segments having the non-sensitive security level.

17. The method of claim 1, wherein the unique inputs assigned to the audio segments with the sensitive security level comprises a special character and the unique inputs assigned to the audio segments having the non-sensitive security level do not comprise the special character.

18. A method of augmenting a voice call between a first mobile device and a second mobile device with supplemental audio, the method comprising:
providing a plurality of pre-recorded audio segments stored in a persistent memory of the second mobile device, wherein each audio segment comprises at least one of private information, confidential information, sensitive information and personal safety information, wherein a unique input is assigned to each audio segment, wherein each audio segment has a sensitive security level or a non-sensitive security level, wherein the unique input assigned to each audio segment with a sensitive security level has a greater complexity than the unique input assigned the audio segments with the non-sensitive security level;
receiving input on a first mobile device during a voice call established between the first mobile device and the second mobile device over a voice channel; and
sending an indication of the audio segment corresponding to the input from the first mobile device to the second mobile device over a data channel between the first mobile device and the second mobile device during the voice call when the received input matches the unique input assigned to one of the plurality of audio segments, wherein the second mobile device selects an audio segment corresponding to the indication of the audio segment from the plurality of pre-recorded audio segments stored in the persistent memory of the second mobile device, and wherein the second mobile device plays the selected audio segment via a speaker of the second mobile device during the voice call.

19. The method of claim 18, further comprising:
retrieving by the second mobile device from a remote resource over a communications network an audio segment corresponding to the indication of the audio segment, the remote resource storing a plurality of pre-recorded audio segments; and
playing, on the second mobile device, the retrieved audio segment via a speaker of the second mobile device during the voice call.

20. The method of claim 18, wherein the selected audio segment is played over audio from the voice call.

21. The method of claim 18, wherein the selected audio is played interweaved between audio from the voice call.

22. A method of augmenting a voice call between a first mobile device and a second mobile device with supplemental audio, the method comprising:
providing a mapping between unique inputs and a plurality of audio segments stored in a persistent memory of the second mobile device, wherein each audio segment comprises at least one of private information, confidential information, sensitive information and personal safety information, wherein each audio segment has a sensitive security level or a non-sensitive security level, wherein the unique input assigned to each audio segment with a sensitive security level has a greater complexity than the unique input assigned the audio segments with the non-sensitive security level;
receiving input on a first mobile device during a voice call established between a first mobile device and a second mobile device over a voice channel; and
sending an indication of a designated phrase corresponding to the input from the first mobile device to the second mobile device over a data channel between the first mobile device and the second mobile device during the voice call when the received input matches the unique input assigned to one of the plurality of audio segments, wherein the second mobile device performs text-to speech synthesis to generate synthesized audio segment corresponding to the designated phrase, and wherein the second mobile device plays the synthesized audio segment via a speaker of the second mobile device during the voice call.

* * * * *